United States Patent
Hanabusa

(10) Patent No.: US 11,211,823 B2
(45) Date of Patent: Dec. 28, 2021

(54) POWER TRANSMISSION DEVICE AND WIRELESS POWER TRANSMISSION SYSTEM

(71) Applicant: TDK CORPORATION, Tokyo (JP)

(72) Inventor: Kazuyoshi Hanabusa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/818,419

(22) Filed: Mar. 13, 2020

(65) Prior Publication Data

US 2020/0303959 A1 Sep. 24, 2020

(30) Foreign Application Priority Data

Mar. 20, 2019 (JP) .............................. JP2019-053108

(51) Int. Cl.
*H02J 50/12* (2016.01)
(52) U.S. Cl.
CPC .................................... *H02J 50/12* (2016.02)
(58) Field of Classification Search
None
See application file for complete search history.

(56) References Cited

U.S. PATENT DOCUMENTS

| | | | |
|---|---|---|---|
| 2008/0157693 A1 | 7/2008 | Yamamoto et al. | |
| 2014/0008969 A1 | 1/2014 | Kanahara et al. | |
| 2014/0125142 A1 | 5/2014 | Kanno | |
| 2016/0052405 A1 | 2/2016 | Koizumi et al. | |
| 2016/0344236 A1* | 11/2016 | Misawa | H02J 7/00712 |
| 2017/0012471 A1* | 1/2017 | Misawa | H02J 7/00034 |
| 2017/0018966 A1* | 1/2017 | Misawa | H02M 7/53871 |
| 2017/0025898 A1* | 1/2017 | Misawa | H02J 7/025 |
| 2017/0025899 A1* | 1/2017 | Misawa | H02M 3/3376 |
| 2018/0205266 A1* | 7/2018 | Miyamoto | H02J 50/12 |
| 2019/0006886 A1* | 1/2019 | Bando | B60L 53/126 |
| 2019/0356168 A1* | 11/2019 | Misawa | H02J 50/80 |
| 2019/0356169 A1* | 11/2019 | Misawa | H02M 7/53878 |
| 2020/0280213 A1* | 9/2020 | Todaka | B60L 53/51 |
| 2020/0303959 A1* | 9/2020 | Hanabusa | H02J 50/12 |

FOREIGN PATENT DOCUMENTS

| | | |
|---|---|---|
| JP | 2006-278062 A | 10/2006 |
| JP | 2014-014225 A | 1/2014 |
| JP | 2018-093691 A | 6/2018 |
| WO | 2014/068989 A1 | 5/2014 |
| WO | 2014/156106 A1 | 10/2014 |
| WO | 2016/006066 A1 | 1/2016 |

* cited by examiner

*Primary Examiner* — Lincoln D Donovan
*Assistant Examiner* — Khareem E Almo
(74) *Attorney, Agent, or Firm* — Oliff PLC

(57) ABSTRACT

A power transmission device which can increase a frequency change width (frequency dispersion region) while curbing output fluctuations. The power transmission device that wirelessly transmits power to a power receiving device includes an inverter configured to convert a voltage into an alternating current voltage with a drive frequency, a power supply configured to generate the voltage to be supplied to the inverter, a power transmission coil configured to be supplied with the alternating current voltage and generate an alternating current magnetic field, and a voltage changing unit configured to spontaneously change an output voltage of the power supply, wherein the inverter is configured to control the drive frequency in response to a change in the output voltage.

24 Claims, 8 Drawing Sheets

POWER TRANSMISSION DEVICE AND WIRELESS POWER TRANSMISSION SYSTEM

CROSS-REFERENCE TO RELATED APPLICATION

Priority is claimed on Japanese Patent Application No. 2019-053108, filed Mar. 20, 2019, the content of which is incorporated herein by reference.

BACKGROUND OF THE INVENTION

Field of the Invention

The present invention relates to a power transmission device and a wireless power transmission system.

Description of Related Art

A wireless power transmission system for wirelessly transmitting power is known. In such a wireless power transmission system, noise is generated when power is transmitted and thus it is necessary to reduce noise.

Examples of methods for dispersing noise are shown below (see Patent Documents 1 to 3).

An electrodeless discharge lamp lighting device and a lighting apparatus described in Patent Document 1 change the drive frequency of an inverter discretely or continuously to disperse the frequency of noise (see Patent Document 1).

A contactless power supply device described in Patent Document 2 changes the drive frequency of an inverter discretely to disperse the frequency of noise (see Patent Document 2).

A power supply device and a wireless power transmission device using the same described in Patent Document 3 change the drive frequency of an inverter to disperse the frequency of noise. These devices change an input voltage to the inverter complementarily to keep the output constant (see Patent Document 3).

[Patent Document 1] Japanese Unexamined Patent Application, First Publication No. 2006-278062

[Patent Document 2] PCT International Publication No. 2016/006066

[Patent Document 3] Japanese Unexamined Patent Application. First Publication No. 2018-93691

However, such noise dispersion methods in the related art have room for improvement in increasing their frequency change width (frequency dispersion region).

For example, the technology described in Patent Document 1 has a problem that the output power also changes when the frequency is changed.

The technology described in Patent Document 2 has problems that selectable frequencies are limited since frequencies providing the same required power are selected as variable frequencies, and thus the amount of noise reduction is also limited.

The technology described in Patent Document 3 has advantages over the technology described in Patent Document 1 or the technology described in Patent Document 2, but still has room for improvement.

The technologies described in Patent Documents 1-3 have room for improvement, for example, in increasing the frequency change width (frequency dispersion region) while curbing output fluctuations.

Specific examples of problems relating to Patent Document 3 will be described.

In output frequency characteristics when the load is heavy (when the output current is large), it is assumed that the output voltage can have a predetermined value V101 between a frequency f101 and a frequency f102 from the characteristics of the minimum and maximum values of an input voltage to the inverter. On the other hand, in output frequency characteristics when the load is light (when the output current is small), it is assumed that the output voltage can have the predetermined value V101 between a frequency f103 and a frequency f104 from the characteristics of the minimum and maximum values of the input voltage to the inverter. Here, it is assumed that the frequency f101, the frequency f103, the frequency f102, and the frequency f104 are in increasing order of frequency.

In this case, if an arbitrary load is used, the frequency can be changed only within a narrow range between the frequency f103 and the frequency f102 and noise components cannot be greatly dispersed. That is, for example, if the frequency is changed within a range between the frequency f101 and the frequency f102, the output voltage can have the predetermined value V101 when the load is heavy. However, if the frequency is smaller than the frequency f103 when the load is light, the output voltage becomes higher than the predetermined value V101 even if the input voltage to the inverter is reduced to the minimum value, such that the output cannot be controlled such that it is constant.

Thus, the technology described in Patent Document 3 has aspects that require improvements.

SUMMARY OF THE INVENTION

The present invention has been made in view of such circumstances and it is an object of the present invention to provide a power transmission device and a wireless power transmission system that can increase a frequency change width (frequency dispersion region) while curbing output fluctuations.

An aspect of the present invention provides a power transmission device for wirelessly transmitting power to a power receiving device, the power transmission device including an inverter configured to convert a voltage into an alternating current voltage with a drive frequency, a power supply configured to generate the voltage to be supplied to the inverter, a power transmission coil configured to be supplied with the alternating current voltage and generate an alternating current magnetic field, and a voltage changing unit configured to spontaneously change an output voltage of the power supply, wherein the inverter is configured to control the drive frequency in response to a change in the output voltage.

According to the present invention, the power transmission device and the wireless power transmission system can increase the frequency change width (frequency dispersion region) while curbing output fluctuations.

DETAILED DESCRIPTION OF THE INVENTION

Hereinafter, embodiments of the present invention will be described with reference to the drawings.
[Wireless Power Transmission System]

Figure 1:
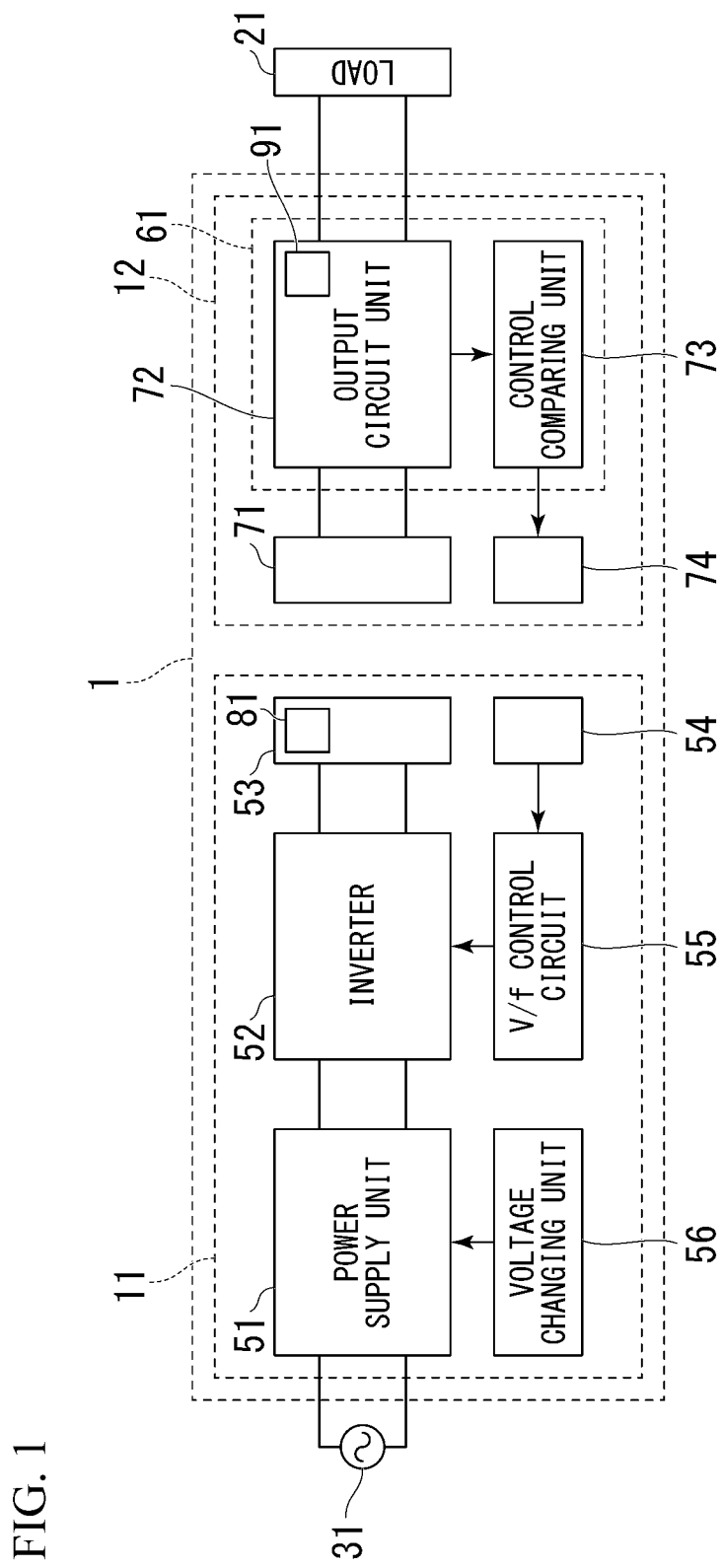
FIG. 1 is a diagram showing a schematic configuration of a wireless power transmission system according to an embodiment of the present invention.

FIG. 1 is a diagram showing a schematic configuration of a wireless power transmission system 1 according to an embodiment of the present invention.

The wireless power transmission system 1 includes a power transmission device 11 and a power receiving device 12.

FIG. 1 also shows an alternating current (AC) unit 31 and a load 21.

In the wireless power transmission system 1, power is transmitted from the power transmission device 11 to the power receiving device 12 to supply power.

The power transmission device 11 includes a power supply unit 51, an inverter 52, a power transmission coil device 53, a power transmission side communication unit 54, a V/f control circuit 55, and a voltage changing unit 56. The power transmission coil device 53 includes a power transmission side resonance circuit 81. The power transmission side resonance circuit 81 includes a power transmission coil and a power transmission side capacitor. In the present embodiment, the AC unit 31 is separate from the power transmission device 11. However, in another exemplary configuration, the AC unit 31 may be integrated with the power transmission device 11.

The power receiving device 12 includes a power receiving coil device 71, an output circuit unit 72, a control comparing unit 73, and a power receiving side communication unit 74. The output circuit unit 72 includes a detection unit 91. In the present embodiment, the load 21 is separate from the power receiving device 12. However, in another exemplary configuration, the load 21 may be integrated with the power receiving device 12.

In the present embodiment, the output circuit unit 72 and the control comparing unit 73 are shown as part of a conversion unit 61 for convenience of explanation. Note that the detection unit 91 may be provided at an arbitrary position in the power receiving device 12.

The load 21 may be an arbitrary load. In the present embodiment, the load 21 is a chargeable and dischargeable secondary battery.

The AC unit 31 is an AC power supply and supplies an AC voltage. The AC unit 31 may be, for example, a commercial AC power supply.

Examples of operations performed in the wireless power transmission system 1 will be described.

First, power transmission from the power transmission device 11 to the power receiving device 12 through electromagnetic induction will be described. The power transmission device 11 operates as follows.

The power supply unit 51 converts an AC voltage supplied from the AC unit 31 into a direct current (DC) voltage and supplies the converted DC voltage to the inverter 52.

The inverter 52 converts the DC voltage supplied from the power supply unit 51 into an AC voltage having a predetermined frequency and supplies the converted AC voltage to the power transmission coil device 53. This frequency is the drive frequency.

The power transmission coil device 53 applies the AC voltage supplied from the inverter 52 to the power transmission coil. This causes the power transmission coil to generate an AC magnetic field.

The voltage changing unit 56 outputs a value based on a reference voltage to a control input terminal (not shown) of the power supply unit 51. In this case, the voltage changing unit 56 adjusts the value to be output to the power supply unit 51.

In the present embodiment, the power supply unit 51 has a function of an AC/DC converter that converts an AC voltage into a DC voltage. The power supply unit 51 converts the AC voltage supplied from the AC unit 31 into a DC voltage on the basis of the value input from the voltage changing unit 56.

The voltage changing unit 56 spontaneously changes the value to be output to the power supply unit 51 during power transmission. Thereby, an output voltage from the power supply unit 51 to the inverter 52 changes during power transmission.

A configuration in which a DC voltage is supplied from the outside to the power supply unit 51 may be used as another exemplary configuration. In this case, the power supply unit 51 has a function of a DC/DC converter that converts the value of the DC voltage. The power supply unit 51 converts the value of the DC voltage supplied from the outside on the basis of the value input from the voltage changing unit 56.

The voltage changing unit 56 spontaneously changes the value to be output to the power supply unit 51 during power transmission. Thereby, the output voltage from the power supply unit 51 to the inverter 52 changes during power transmission.

Another method may be used as a method of changing the output voltage from the power supply unit 51 to the inverter 52.

For example, in the power transmission device 11, a configuration for changing the output voltage to the inverter 52 may be employed in the power supply unit 51. In this case, the power transmission device 11 may not include the voltage changing unit 56.

Although the case where the voltage output from the power supply unit 51 is changed by changing a voltage is described in the present embodiment, the voltage output from the power supply unit 51 may be changed, for example, by changing a current or power.

The power receiving device 12 operates as follows.

The power receiving coil device 71 outputs an AC voltage, which is generated in the power receiving coil by an AC magnetic field generated from the power transmission coil of the power transmission device 11, to the output circuit unit 72. Here, the power receiving coil receives AC power wirelessly transmitted from the power transmission coil.

The output circuit unit 72 rectifies the AC voltage input from the power receiving coil device 71 to convert it into a DC voltage and supplies the converted DC voltage to the load 21.

Next, feedback control from the power receiving device 12 to the power transmission device 11 will be described.

The power receiving device 12 operates as follows.

In the output circuit unit 72, the detection unit 91 detects the voltage supplied to the load 21.

The control comparing unit 73 generates a control signal for feedback control on the basis of the voltage detected by the detection unit 91 of the output circuit unit 72 and outputs the generated control signal to the power receiving side communication unit 74.

The control comparing unit 73 generates a control signal such that a value to be controlled becomes a target value. The target value is set using a reference voltage. In the present embodiment, the control comparing unit 73 generates a control signal for keeping the voltage supplied from the output circuit unit 72 to the load 21 at the reference voltage that is a constant value (target value). In another example, when the voltage supplied from the output circuit unit 72 to the load 21 is divided and measured, the control comparing unit 73 may generate a control signal for keeping the voltage after division at the reference voltage that is a constant value (target value).

The power receiving side communication unit 74 has a communication function and transmits, for example, the control signal input from the control comparing unit 73 to the power transmission device 11.

Here, communication of the control signal is performed, for example, wirelessly. However, in another exemplary configuration, a terminal of the power transmission device 11 and a terminal of the power receiving device 12 may be connected directly or via a cable and communication of the control signal may be performed via these terminals.

The power transmission device 11 operates as follows.

The power transmission side communication unit 54 has a communication function and, for example, receives a control signal transmitted from the power receiving side communication unit 74 of the power receiving device 12 and transmits the received control signal to the V/f control circuit 55.

The V/f control circuit 55 outputs, to the inverter 52, a control signal for controlling the frequency of the AC voltage supplied from the inverter 52 to the power transmission coil device 53 (the drive frequency) on the basis of a control signal input from the power transmission side communication unit 54. In the present embodiment, the frequency is controlled by a voltage of the control signal.

The inverter 52 controls the drive frequency on the basis of the control signal input from the V/f control circuit 55. Thereby, the frequency of the AC voltage supplied from the inverter 52 to the power transmission coil device 53 changes and feedback control for keeping the voltage supplied from the output circuit unit 72 to the load 21 constant is performed.

Here, the control signal generated by the control comparing unit 73 of the power receiving device 12 and the control signal input to the inverter 52 of the power transmission device 11 are signals that directly or indirectly indicate the drive frequency.

In the present embodiment, when the voltage changing unit 56 spontaneously changes the value to be output to the power supply unit 51 in the power transmission device 11, an output level (operating point) from the power transmission device 11 changes. Then, feedback from the power receiving device 12 to the power transmission device 11 changes the drive frequency of the inverter 52 in the power transmission device 11 such that the output level becomes a target value. The output of the power transmission device 11 is spontaneously changed in this manner, thereby dispersing the frequency of noise.

[Configuration for Changing Output Voltage]

In the present embodiment, a method in which the voltage changing unit 56 changes the value of the reference voltage is described as a method of changing the voltage output from the power supply unit 51, but another method may be used. For example, a method in which the voltage changing unit 56 changes a value to be compared with the reference voltage may be used as another method.

An example of an equivalent circuit for implementing these methods will be described with reference to FIGS. 2 and 3.

<Example of Equivalent Circuit when Changing Output Voltage by Changing Reference Voltage>

Figure 2:
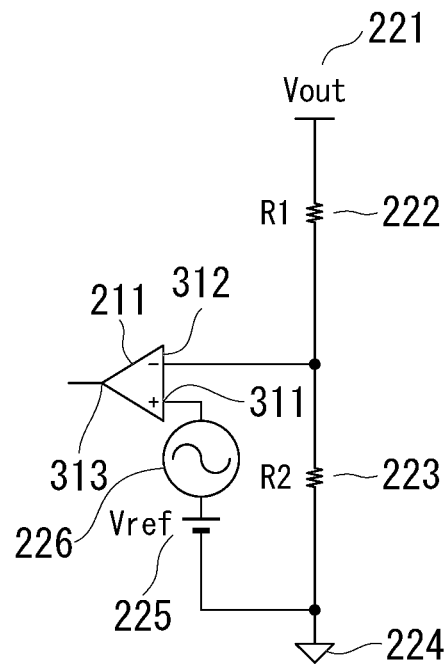
FIG. 2 is a diagram showing an example of an equivalent circuit of a voltage changing unit when changing an output voltage by changing a reference voltage according to an embodiment of the present invention.

FIG. 2 is a diagram showing an example of an equivalent circuit of the voltage changing unit 56 when changing the output voltage by changing the reference voltage according to an embodiment of the present invention.

Hereinafter, the equivalent circuit will be described assuming that it is a normal circuit for convenience of explanation. Since the equivalent circuit does not represent an actual circuit, each component in the circuit is represented as implementing a function such that, for example, an AC generator 226 is represented as a functional unit of generating an AC rather than being provided with an AC power supply.

The circuit shown in FIG. 2 includes an operational amplifier 211 configured using an IC, a voltage input terminal 221 for inputting a voltage Vout output from the power supply unit 51, a resistor 222 having a resistance R1, a resistor 223 having a resistance R2, a ground terminal 224 that is grounded, a reference voltage source 225 that outputs a predetermined reference voltage Vref, and the AC generator 226.

The operational amplifier 211 has a positive input terminal 311, a negative input terminal 312, and an output terminal 313.

In the present embodiment, the voltage input from the power supply unit 51 to the voltage input terminal 221 is the same as the voltage output from the power supply unit 51 to the inverter 52. A configuration for applying the output voltage from the power supply unit 51 to the voltage input terminal 221 is not shown in FIG. 1.

The voltage input terminal 221 and one end of the resistor 222 are connected. The other end of the resistor 222 and one end of the resistor 223 are connected. The other end of the resistor 223 and the ground terminal 224 are connected. A negative terminal of the reference voltage source 225 and the ground terminal 224 are connected.

The AC generator 226 is arranged between a positive terminal of the reference voltage source 225 and the positive input terminal 311 of the operational amplifier 211.

A connection point between the resistor 222 and the resistor 223 and the negative input terminal 312 of the operational amplifier 211 are connected.

The output terminal 313 of the operational amplifier 211 and the control input terminal (not shown) of the power supply unit 51 are connected.

Operations performed in the circuit shown in FIG. 2 will be described.

The AC generator 226 periodically changes the magnitude of the reference voltage Vref and outputs the changed voltage to the positive input terminal 311 of the operational amplifier 211. For example, the voltage has a waveform such as a sinusoidal wave. Thereby, the AC generator 226 changes the reference voltage.

A voltage obtained by dividing the output voltage Vout from the power supply unit 51 through the resistors 222 to 223 is applied to the negative input terminal 312 of the operational amplifier 211.

In the present embodiment, the value of a voltage that is output from the output terminal 313 of the operational amplifier 211 to the power supply unit 51 when a voltage input to the positive input terminal 311 of the operational amplifier 211 matches a voltage input to the negative input terminal 312 of the operational amplifier 211 is used as a reference value for feedback control. At the reference value for feedback control, the output voltage from the power supply unit 51 has a value corresponding to the target value. If the value of the voltage output from the output terminal 313 of the operational amplifier 211 to the power supply unit 51 deviates from the reference value of feedback control, feedback control for causing the value to approach the reference value is performed such that the output voltage from the power supply unit 51 is kept at a value corresponding to the target value.

<Example of Equivalent Circuit when Changing Output Voltage by Changing Value to be Compared with Reference Voltage>

Figure 3:
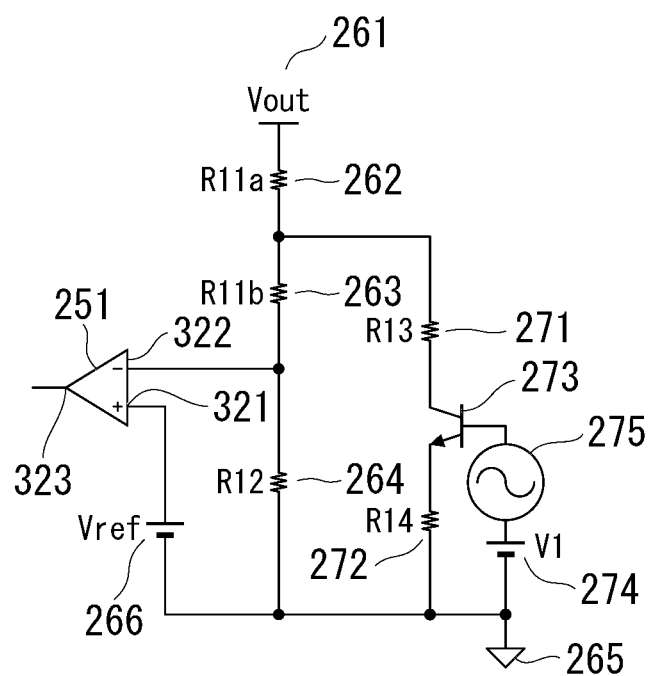
FIG. 3 is a diagram showing an example of an equivalent circuit of a voltage changing unit when changing an output voltage by changing a value to be compared with a reference voltage according to an embodiment of the present invention.

FIG. 3 is a diagram showing an example of an equivalent circuit of the voltage changing unit 56 when changing the output voltage by changing a value to be compared with the reference voltage according to the embodiment of the present invention.

Hereinafter, the equivalent circuit will be described assuming that it is a normal circuit for convenience of explanation. Since the equivalent circuit does not represent an actual circuit, each component in the circuit is represented as implementing a function such that, for example, an AC generator 275 is represented as a functional unit of generating an AC rather than being provided with an AC power supply.

The circuit shown in FIG. 3 includes an operational amplifier 251 configured using an IC, a voltage input terminal 261 for inputting a voltage Vout output from the power supply unit 51, a resistor 262 having a resistance R11a, a resistor 263 having a resistance R11b, a resistor 264 having a resistance R12, a ground terminal 265 that is grounded, a reference voltage source 266 that outputs a predetermined reference voltage Vref, a resistor 271 having a resistance R13, a resistor 272 having a resistance R14, a transistor 273, a voltage source 274 that outputs a predetermined voltage V1, and the AC generator 275.

The operational amplifier 251 has a positive input terminal 321, a negative input terminal 322, and an output terminal 323.

In the present embodiment, the voltage input from the power supply unit 51 to the voltage input terminal 261 is the same as the voltage output from the power supply unit 51 to the inverter 52. A configuration for applying the output voltage from the power supply unit 51 to the voltage input terminal 261 is not shown in FIG. 1.

The voltage input terminal 261 and one end of the resistor 262 are connected. The other end of the resistor 262 and one end of the resistor 263 are connected, in parallel with which the other end of the resistor 262 and one end of the resistor 271 are connected. The other end of the resistor 263 and one end of the resistor 264 are connected. The other end of the resistor 264 and the ground terminal 265 are connected.

A collector terminal of the transistor 273 and the other end of the resistor 271 are connected. An emitter terminal of the transistor 273 and one end of the resistor 272 are connected. The other end of the resistor 272 and the ground terminal 265 are connected.

A negative terminal of the voltage source 274 and the ground terminal 265 are connected.

An AC generator 275 is arranged between a positive terminal of the voltage source 274 and a base terminal of the transistor 273.

A negative terminal of the reference voltage source 266 and the ground terminal 265 are connected. A positive terminal of the reference voltage source 266 and the positive input terminal 321 of the operational amplifier 251 are connected.

A connection point between the resistors 263 and 264 and the negative input terminal 322 of the operational amplifier 251 are connected.

The output terminal 323 of the operational amplifier 251 and the control input terminal (not shown) of the power supply unit 51 are connected.

Operations performed in the circuit shown in FIG. 3 will be described.

The AC generator 275 periodically changes the magnitude of the voltage V1 and outputs the changed voltage to the base terminal of the transistor 273. For example, the voltage has a waveform such as a sinusoidal wave. Such an operation of the AC generator 275 changes the voltage at the connection point between the resistors 262 and 263 and also changes the voltage at the connection point between the resistors 263 and 264. In response to this, the voltage changing unit 56 performs control of changing the output voltage from the power supply unit 51 such that the voltage at the connection point between the resistors 263 and 264 matches the reference voltage Vref. In this case, the voltage at the connection point between the resistors 262 and 263 does not actually change.

In the present embodiment, the value of a voltage that is output from the output terminal 323 of the operational amplifier 251 to the power supply unit 51 when a voltage input to the positive input terminal 321 of the operational amplifier 251 matches a voltage input to the negative input terminal 322 of the operational amplifier 251 is used as a reference value for feedback control. At the reference value for feedback control, the output voltage from the power supply unit 51 has a value corresponding to the target value. If the value of the voltage output from the output terminal 323 of the operational amplifier 251 to the power supply unit 51 deviates from the reference value of feedback control, feedback control for causing the value to approach the reference value is performed such that the output voltage from the power supply unit 51 is kept at a value corresponding to the target value.

[Output Frequency Characteristics]

A description will be given with reference to FIGS. 4 and 5.

Figure 4:
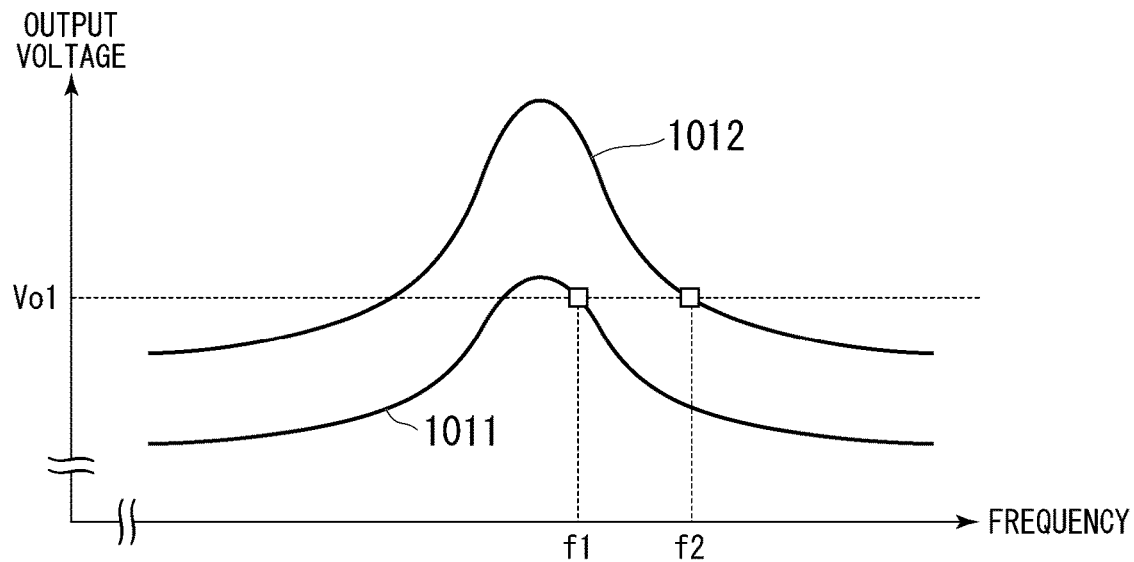
FIG. 4 is a diagram showing output frequency characteristics when a load is heavy according to an embodiment of the present invention.

FIG. 4 is a diagram showing output frequency characteristics when the load 21 is heavy according to an embodiment of the present invention.

In the present embodiment, the load 21 being heavy means that an output current from the power receiving device 12 to the load 21 is large. In the present embodiment, whether the load 21 is heavy or light (whether the output current is large or small) is a relative relationship between an example of FIG. 4 and an example of FIG. 5.

In graphs shown in FIG. 4, the horizontal axis represents frequency. The vertical axis represents the output voltage from the power supply unit 51 to the inverter 52. In the present embodiment, the output voltage from the power supply unit 51 to the inverter 52 is equal to the input voltage to the inverter 52.

The graphs show output frequency characteristics 1011 when the input voltage to the inverter 52 has a minimum value and output frequency characteristics 1012 when the input voltage to the inverter 52 has a maximum value.

In the present embodiment, whether the input voltage to the inverter 52 is high or low is a relative relationship.

The output frequency characteristics 1011 and 1012 are characteristics of the drive frequency of the inverter 52 of the power transmission device 11.

Figure 5:
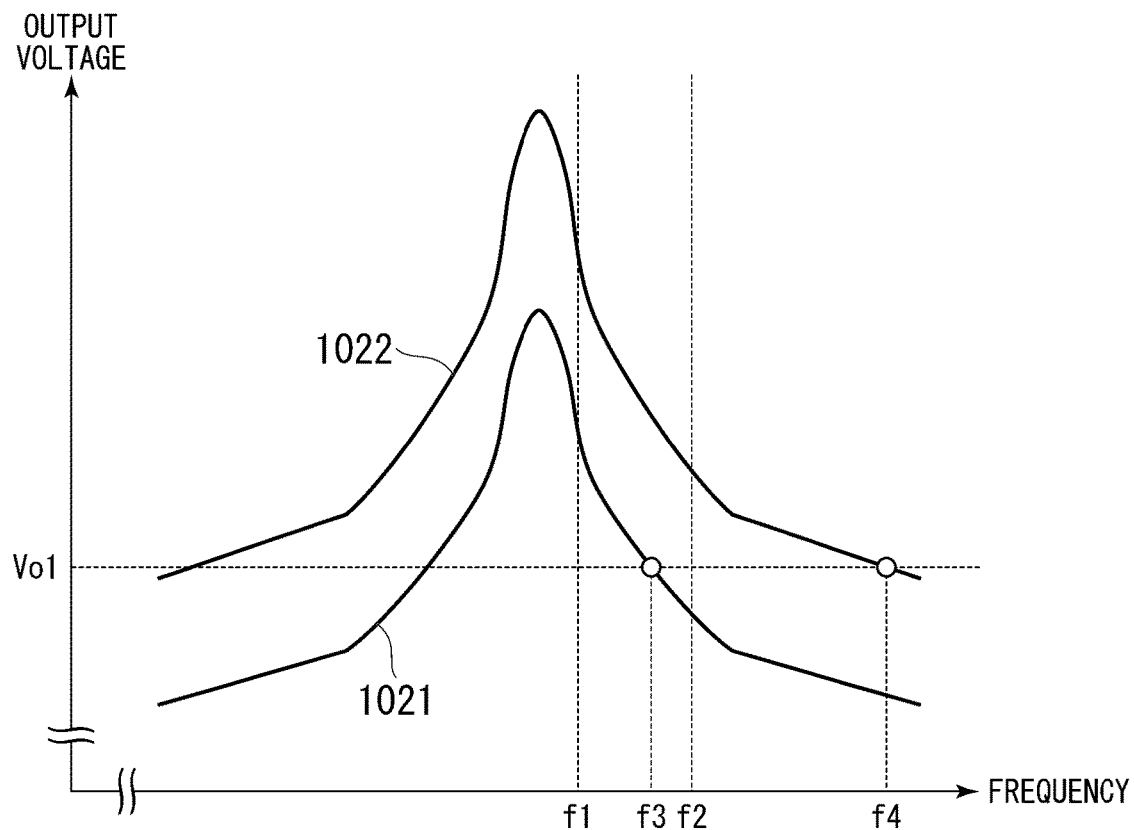
FIG. 5 is a diagram showing output frequency characteristics when a load is light according to an embodiment of the present invention.

FIG. 5 is a diagram showing output frequency characteristics when the load 21 is light according to an embodiment of the present invention.

In graphs shown in FIG. 5, the horizontal axis represents frequency. The vertical axis represents the output voltage from the power supply unit 51 to the inverter 52.

The graphs show output frequency characteristics 1021 when the input voltage to the inverter 52 has a minimum value and output frequency characteristics 1022 when the input voltage to the inverter 52 has a maximum value.

The output frequency characteristics 1021 and 1022 are characteristics of the drive frequency of the inverter 52 of the power transmission device 11.

In the examples of FIGS. 4 and 5, an output voltage Vol is a target value.

In the example of FIG. 4, a frequency f1 is a frequency at which the output voltage Vol is realized in the output frequency characteristics 1011. Further, in the example of FIG. 4, a frequency f2 is a frequency at which the output voltage Vol is realized in the output frequency characteristics 1012.

In the example of FIG. 5, a frequency f3 is a frequency at which the output voltage Vol is realized in the output frequency characteristics 1021. Further, in the example of FIG. 5, a frequency f4 is a frequency at which the output voltage Vol is realized in the output frequency characteristics 1022.

In the examples of FIGS. 4 and 5, the frequency f1, the frequency f3, the frequency f2, and the frequency f4 are in increasing order of frequency.

Changing the output voltage as described above disperses the frequency over a range from the frequency f1 to the frequency f2 when the load 21 is heavy and disperses the frequency over a range from the frequency f3 to the frequency f4 when the load 21 is light. Therefore, the wireless power transmission system 1 according to the present embodiment can extend the dispersion range.

[Continuous Change]

<Continuous Change According to Triangular Wave>

A continuous change according to a triangular wave will be described with reference to FIGS. 6 to 8.

Figure 6:
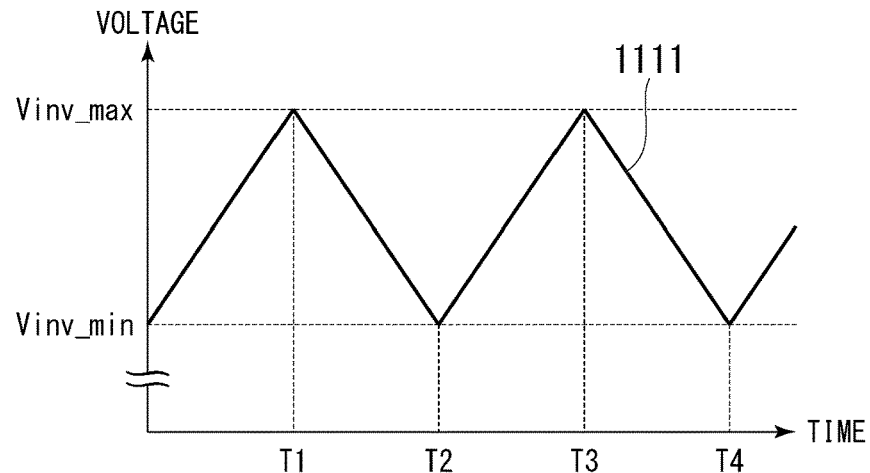
FIG. 6 is a diagram showing an example of an input voltage to an inverter which changes continuously in response to a triangular wave according to an embodiment of the present invention.

FIG. 6 is a diagram showing an example of the input voltage to the inverter 52 which changes continuously according to a triangular wave according to an embodiment of the present invention.

In a graph shown in FIG. 6, the horizontal axis represents time. The vertical axis indicates the value of the input voltage to the inverter 52 which changes.

It is assumed that time T1, time T2, time T3, and time T4 are at fixed intervals in chronological order.

The graph of FIG. 6 shows characteristics 1111 of the value of the input voltage to the inverter 52 that is changed along a triangular wave. The minimum value of the triangular wave is represented as Vinv_min and the maximum value of the triangular wave is represented as Vinv_max.

The period of the triangular wave is T2, which corresponds to the reciprocal of the frequency of the triangular wave.

Figure 7:
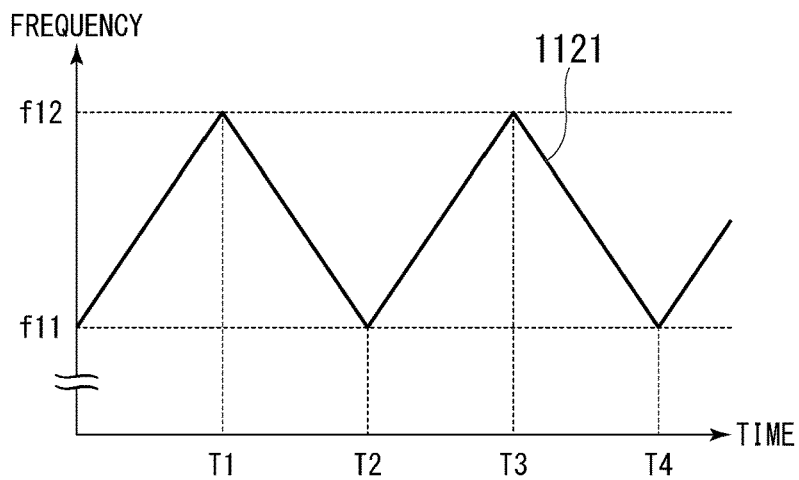
FIG. 7 is a diagram showing an example of a frequency which changes continuously in response to a triangular wave according to an embodiment of the present invention.

FIG. 7 is a diagram showing an example of a frequency which changes continuously according to a triangular wave according to an embodiment of the present invention. This frequency is the drive frequency of the inverter 52.

In a graph shown in FIG. 7, the horizontal axis represents time. The vertical axis indicates the value of the drive frequency of the inverter 52.

Time T1, time T2, time T3, and time T4 are the same as those shown in FIG. 6. The graph of FIG. 7 shows characteristics 1121 of the value of the drive frequency which changes along a triangular wave. The minimum value of the triangular wave is represented as f11 and the maximum value of the triangular wave is represented as f12.

The period of the triangular wave is T2, which corresponds to the reciprocal of the frequency of the triangular wave.

The period of the characteristics 1111 of the value of the input voltage to the inverter 52 shown in FIG. 6 and the period of the characteristics 1121 of the value of the drive frequency shown in FIG. 7 match. That is, the positions of the maximum values and the minimum values match.

Figure 8:
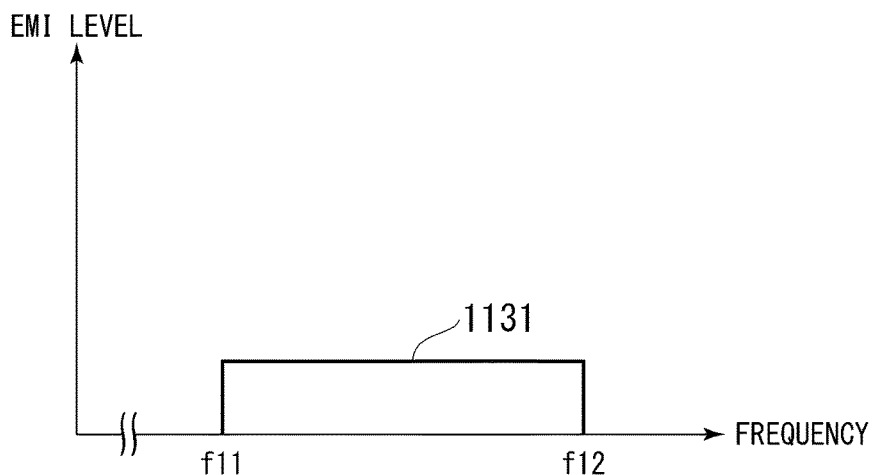
FIG. 8 is a diagram showing an example of an EMI level when a triangular wave is used according to an embodiment of the present invention.

FIG. 8 is a diagram showing an example of an electromagnetic interference (EMI) level when a triangular wave is used according to an embodiment of the present invention.

In a graph shown in FIG. 8, the horizontal axis represents frequency. The vertical axis indicates the EMI level.

The graph of FIG. 8 shows characteristics 1131 of the EMI level. In the characteristics 1131, the EMI level is uniformly distributed over a range from the frequency f11 to the frequency f12. That is, noise dispersion is performed in a predetermined frequency range.

In the examples of FIGS. 6 to 8, the voltage changing unit 56 spontaneously changes the output voltage from the power supply unit 51 to the inverter 52 (the input voltage to the inverter 52) along the triangular wave shown in FIG. 6.

<Continuous Change According to Sinusoidal Wave>

A continuous change according to a sinusoidal wave will be described with reference to FIGS. 9 to 11.

Figure 9:
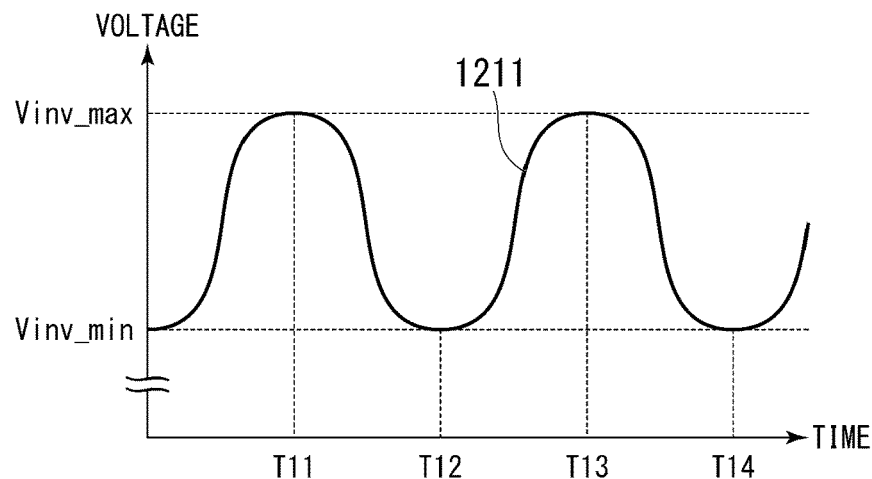
FIG. 9 is a diagram showing an example of an input voltage to the inverter which changes continuously in response to a sinusoidal wave according to an embodiment of the present invention.

FIG. 9 is a diagram showing an example of the input voltage to the inverter 52 which changes continuously according to a sinusoidal wave according to an embodiment of the present invention.

In a graph shown in FIG. 9, the horizontal axis represents time. The vertical axis indicates the value of the input voltage to the inverter 52 which changes.

It is assumed that time T11, time T12, time T13, and time T14 are at fixed intervals in chronological order.

The graph of FIG. 9 shows characteristics 1211 of the value of the input voltage to the inverter 52 that is changed along a sinusoidal wave. The minimum value of the sinusoidal wave is represented as Vinv_min and the maximum value of the sinusoidal wave is represented as Vinv_max.

The period of the sinusoidal wave is T12, which corresponds to the reciprocal of the frequency of the sinusoidal wave.

Figure 10:
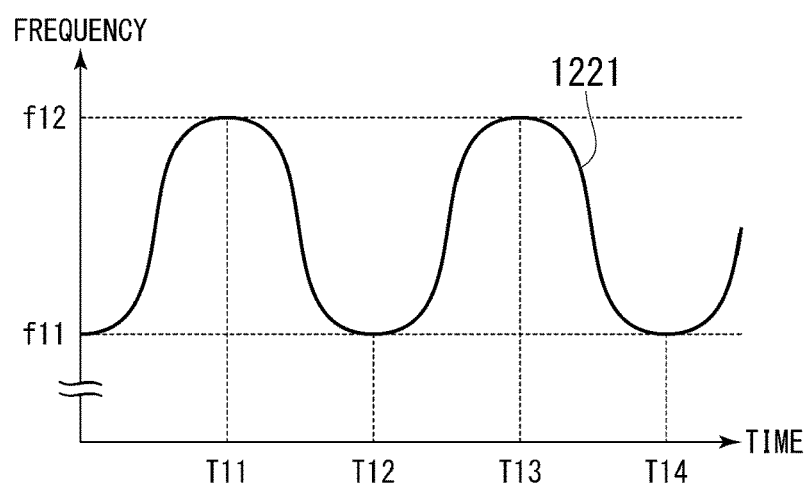
FIG. 10 is a diagram showing an example of a frequency which changes continuously in response to a sinusoidal wave according to an embodiment of the present invention.

FIG. 10 is a diagram showing an example of a frequency which changes continuously according to a sinusoidal wave according to an embodiment of the present invention. This frequency is the drive frequency of the inverter 52.

In a graph shown in FIG. 10, the horizontal axis represents time. The vertical axis indicates the value of the drive frequency of the inverter 52.

Time T11, time T12, time T13, and time T14 are the same as those shown in FIG. 9. The graph of FIG. 10 shows characteristics 1221 of the value of the drive frequency which changes along a sinusoidal wave. The minimum value of the sinusoidal wave is represented as f11 and the maximum value of the sinusoidal wave is represented as f12.

The period of the sinusoidal wave is T12, which corresponds to the reciprocal of the frequency of the sinusoidal wave.

The period of the characteristics 1211 of the value of the input voltage to the inverter 52 shown in FIG. 9 and the period of the characteristics 1221 of the value of the drive frequency shown in FIG. 10 match. That is, the positions of the maximum values and the minimum values match.

Figure 11:
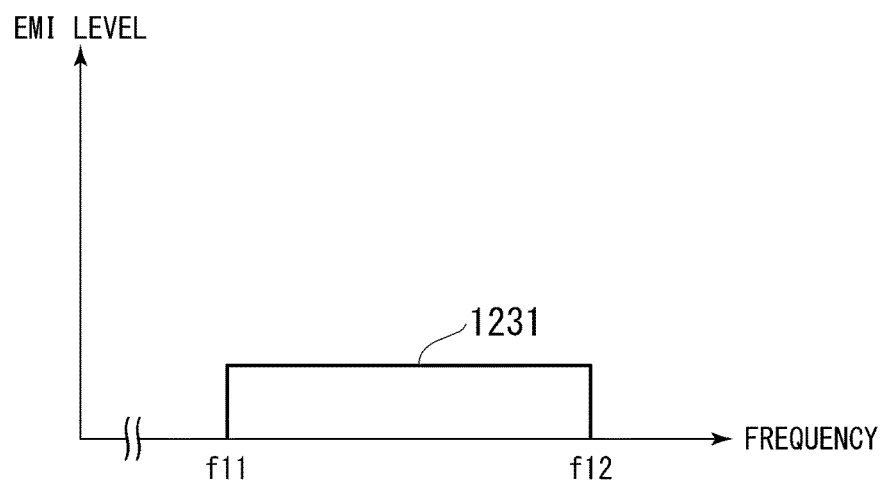
FIG. 11 is a diagram showing an example of an EMI level when a sinusoidal wave is used according to an embodiment of the present invention.

FIG. 11 is a diagram showing an example of an EMI level when a sinusoidal wave is used according to an embodiment of the present invention.

In a graph shown in FIG. 11, the horizontal axis represents frequency. The vertical axis indicates the EMI level.

The graph of FIG. 11 shows characteristics 1231 of the EMI level. In the characteristics 1231, the EMI level is uniformly distributed over a range from the frequency f11 to the frequency f12. That is, noise dispersion is performed in a predetermined frequency range.

In the examples of FIGS. 9 to 11, the voltage changing unit 56 spontaneously changes the output voltage from the power supply unit 51 to the inverter 52 (the input voltage to the inverter 52) along the sinusoidal wave shown in FIG. 9.

Modes in which the input voltage to the inverter 52 is changed continuously are not limited to the examples of FIGS. 6 to 8 or the examples of FIGS. 9 to 11 and various other modes may be used. The output voltage from the power supply unit 51 to the inverter 52 (the input voltage to the inverter 52) is changed continuously, for example, during power transmission.

[Discrete Change]

Figure 12:
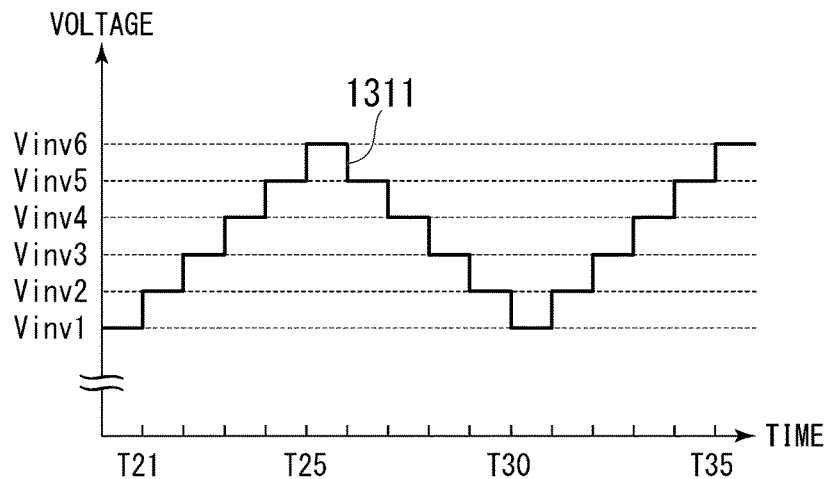
FIG. 12 is a diagram showing an example of an input voltage to the inverter which changes discretely according to an embodiment of the present invention.

FIG. 12 is a diagram showing an example of the input voltage to the inverter 52 which changes discretely according to an embodiment of the present invention.

In a graph shown in FIG. 12, the horizontal axis represents time. The vertical axis indicates the value of the input voltage to the inverter 52 which changes.

It is assumed that time T21, . . . , time T25, . . . , time T30, . . . , and time T35 are at fixed time intervals in chronological order.

The graph of FIG. 12 shows characteristics 1311 of the value of the input voltage to the inverter 52 that is changed along a stepwise form. Values of the input voltage to the inverter 52 in the stepwise form are represented as Vinv1, Vinv2, Vinv3, Vinv4, Vinv5, and Vinv6. It is assumed that Vinv1, Vinv2, Vinv3, Vinv4, Vinv5, and Vinv6 are values of the input voltage to the inverter 52 at fixed intervals in increasing order of the value.

In the present embodiment, it is assumed that a period of the stepwise form is a minimum duration over which the value of the input voltage to the inverter 52 can change. Specifically, the period is $T(i)-T(i-1)$ when an i-th time (i is an integer of 1 or more) at which the value of the input voltage to the inverter 52 changes stepwise is represented as $T(i)$.

Figure 13:
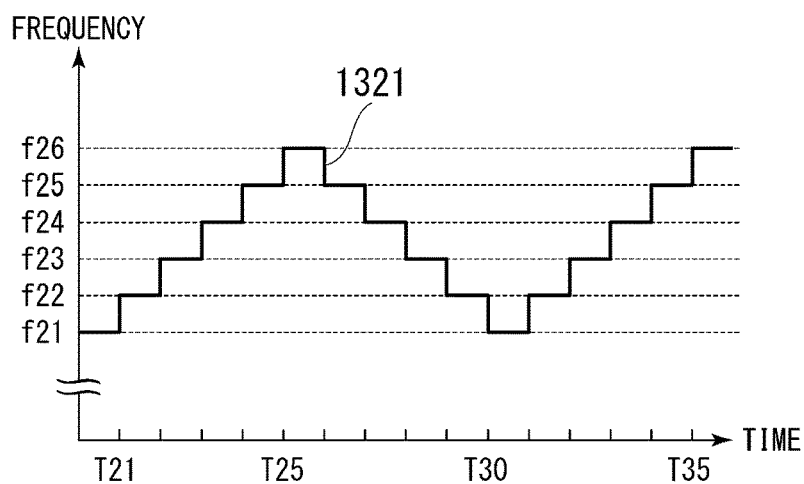
FIG. 13 is a diagram showing an example of a frequency which changes discretely according to an embodiment of the present invention.

FIG. 13 is a diagram showing an example of a frequency which changes discretely according to an embodiment of the present invention. This frequency is the drive frequency of the inverter 52.

In a graph shown in FIG. 13, the horizontal axis represents time. The vertical axis indicates the value of the drive frequency of the inverter 52.

Time T21, . . . , time T25, . . . , time T30, . . . , and time T35 are the same as those shown in FIG. 12.

The graph of FIG. 13 shows characteristics 1321 of the value of the drive frequency which changes along a stepwise form. The minimum value of the drive frequency in the stepwise form is represented as f21 and the maximum value of the drive frequency in the stepwise form is represented as f26. In the present embodiment, it is assumed that f21, f22, f23, f24, f25, and f26 are frequencies at fixed intervals in increasing order. These frequencies f21, f22, f23, f24, f25, and f26 correspond respectively to the values of the input voltage Vinv1, Vinv2, Vinv3, Vinv4, Vinv5, and Vinv6 of the inverter 52.

In the present embodiment, it is assumed that a period of the stepwise form is a minimum duration over which the value of the drive frequency of the inverter 52 can change. Specifically, the period is $T(i)-T(i-1)$ when an i-th time (i is an integer of 1 or more) at which the value of the drive frequency of the inverter 52 changes stepwise is represented as $T(i)$.

Increase/decrease relations of the characteristics 1311 of the value of the input voltage to the inverter 52 shown in FIG. 12 and increase/decrease relations of the characteristics 1321 of the value of the drive frequency shown in FIG. 13 match. That is, the positions of the maximum values and the minimum values match.

Figure 14:
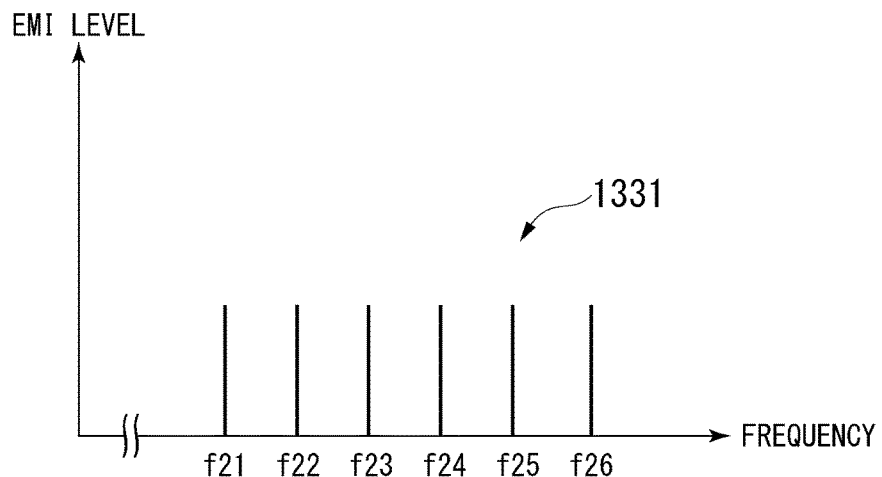
FIG. 14 is a diagram showing an example of an EMI level when a change in a stepwise form is used according to an embodiment of the present invention.

FIG. 14 is a diagram showing an example of an EMI level when a change in a stepwise form is used according to an embodiment of the present invention.

In a graph shown in FIG. 14, the horizontal axis represents frequency. The vertical axis indicates the EMI level.

The graph of FIG. 14 shows characteristics 1331 of the EMI level. In the characteristics 1331, the EMI level is uniformly distributed over a range from the frequency f21 to the frequency f26. That is, noise dispersion is performed over a plurality of frequencies.

In the examples of FIGS. 12 to 14, the voltage changing unit 56 spontaneously changes the output voltage from the power supply unit 51 to the inverter 52 (the input voltage to the inverter 52) along the stepwise form shown in FIG. 12.

Modes in which the output voltage from the power supply unit 51 to the inverter 52 (the input voltage to the inverter 52) is changed discretely are not limited to the examples in FIGS. 12 to 14 and various other modes may be used. The output voltage is changed discretely, for example, during power transmission.

For example, although the case where the values Vinv1 to Vinv6 of the input voltage to the inverter 52 differ at equal intervals is described in the examples of FIGS. 12 to 14, these intervals may be unequal.

Although the case where the times T21 to T35 differ at equal intervals is described in the examples of FIGS. 12 to 14, these intervals may be unequal.

[Control Loop Frequency in Control of Changing Input Voltage to Inverter]

Figure 15:
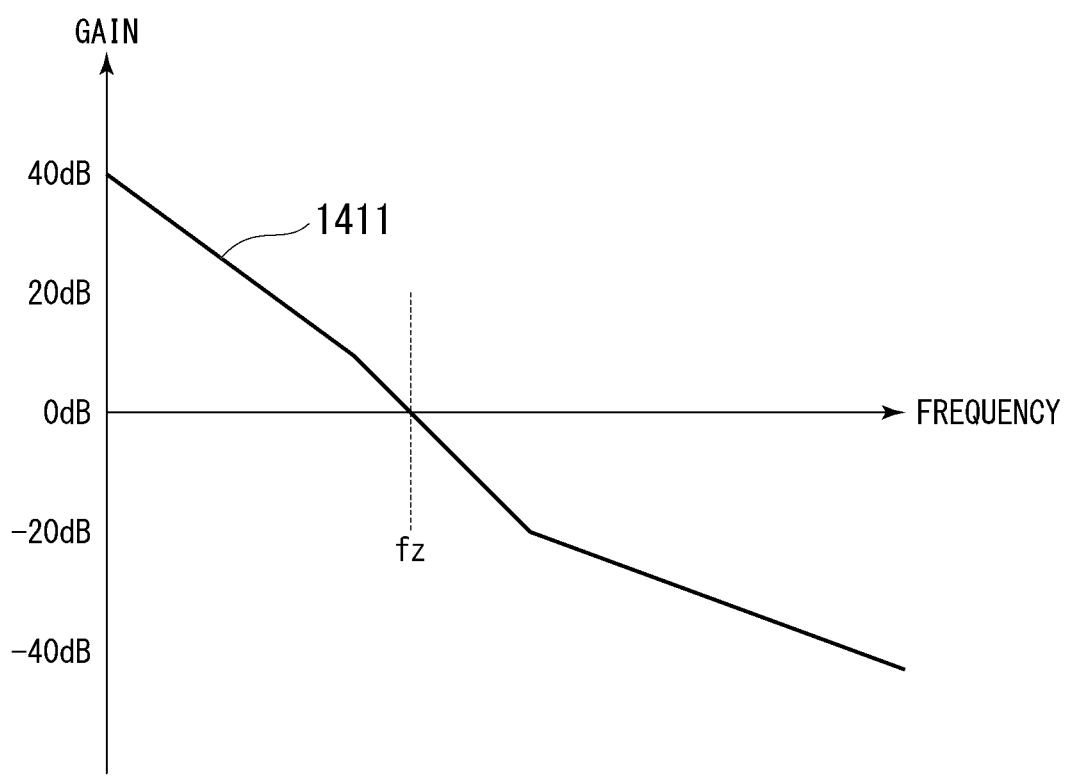
FIG. 15 is a diagram showing an example of frequency characteristics of a feedback gain according to an embodiment of the present invention.

FIG. 15 is a diagram showing an example of frequency characteristics of a feedback gain according to an embodiment of the present invention.

In a graph shown in FIG. 15, the horizontal axis represents a control loop frequency in control of changing the input voltage to the inverter. The vertical axis represents the feedback gain.

The graph of FIG. 15 shows characteristics 1411 of the relationship between the control loop frequency and the feedback gain. Such characteristics 1411 are obtained from the device design.

It is preferable that the control loop frequency be smaller than a frequency fz when the feedback gain is 0 dB. That is, it is preferable that the period of a control loop in which the voltage changing unit 56 changes the input voltage to the inverter 52 be longer than a period with which the loop gain of feedback control is 0 dB.

It is more preferable that the period of the control loop in which the voltage changing unit 56 changes the input voltage to the inverter 52 be longer than 10 times a period with which the loop gain of feedback control is 0 dB. In this case, the wireless power transmission system 1 can reliably prevent malfunction.

When the input voltage to the inverter 52 changes continuously as in the examples of FIGS. 6 to 8 or FIGS. 9 to 11, a period corresponding to the reciprocal of the frequency at which the input voltage to the inverter 52 changes is set as the period of the control loop in which the voltage changing unit 56 changes the input voltage to the inverter 52. In these examples, the period corresponds to the time interval of a wave portion (for example, a mountain portion) of the same shape that repeats continuously.

When the input voltage to the inverter 52 changes discretely as in the examples of FIGS. 12 to 14, a duration between the time when the input voltage to the inverter 52 changes to one value and the time when the input voltage changes to another value, that is, a duration during which the input voltage to the inverter 52 remains unchanged, is set as the period of the control loop in which the voltage changing unit 56 changes the input voltage to the inverter 52. In the examples of FIGS. 12 to 14, specifically, a duration during which the stepwise level is constant, such as a duration between the times T21 and T22 and a duration between the times T22 and T23, is set as the period. Although the case where such a duration is constant and the period is constant is described in the examples of FIGS. 12 to 14, a mode in which such a duration is not constant and the period is not constant may be used in another example.

A configuration may also be used in which the period of the control loop in which the voltage changing unit 56 changes the input voltage to the inverter 52 is shorter than the period with which the loop gain of feedback control is 0 dB.

[Mode of Spontaneously Changing Output Voltage]

In the present embodiment, to spontaneously change the output voltage does not mean, for example, to change the output voltage in response to a change in the original output, a feedback signal corresponding to a change in the original output, or a disturbance. Instead, to spontaneously change the output voltage means to change the output voltage according to a predetermined method regardless of a change in the original output, a feedback signal corresponding to a change in the original output, or a disturbance. As the predetermined method, it is possible to use, for example, a method in which the timing of changing the output voltage and the value of the output voltage changed at each timing are determined in a fixed manner or a method in which one or both of the timing of changing the output voltage and the value of the output voltage changed at each timing are determined randomly.

As a specific example, in a mode in which the output voltage is spontaneously changed, the output voltage is changed to both an upper limit value and a lower limit value of a range in which the output voltage is variable (that is, both ends of the range) a plurality of times within a limited time.

[Control in Power Receiving Device]

Although a configuration in which spontaneous control for load distribution is performed in the power transmission device 11 has been described above, spontaneous control for load distribution may be performed in the power receiving device 12 in another exemplary configuration, which achieves the same advantages. For example, the load impedance is spontaneously changed in the power receiving device 12.

Also, spontaneous control for load distribution may be performed in the power transmission device 11 while spontaneous control for load distribution is performed in the power receiving device 12.

[Specific Example of Load Impedance Control in Power Receiving Device]

Control of spontaneously changing a value detected by the detection unit 91 and control of spontaneously changing the reference value of the control signal that the control comparing unit 73 generates on the basis of the value detected by the detection unit 91 will be described as examples of the control of the load impedance in the power receiving device 12. The power receiving device 12 may perform one or more of these controls.

In the present embodiment, a value to be changed is referred to as a change target value for convenience of explanation.

<Control of Spontaneously Changing Value Detected by Detection Unit>

In the power receiving device 12, the detection unit 91 in the output circuit unit 72 spontaneously changes a value detected by the detection unit 91 (a voltage value in the present embodiment) and outputs the changed value to the control comparing unit 73. The control comparing unit 73 performs control on the basis of this value.

Here, as a mode in which the value detected by the detection unit 91 is spontaneously changed, it is possible to use, for example, the same as any one of the modes that have been described with regard to control of changing a value by the voltage changing unit 56 of the power transmission device 11.

Although the case where the detection unit 91 spontaneously changes the value detected by the detection unit 91 has been described here, a functional unit other than the detection unit 91 in the output circuit unit 72 may spontaneously change a value detected by the detection unit 91 and output the changed value to the control comparing unit 73 in another example.

<Control of Spontaneously Changing Reference Value of Control Signal Generated by Control Comparing Unit>

In the power receiving device 12, the control comparing unit 73 spontaneously changes a reference value of a control signal when generating the control signal on the basis of a value detected by the detection unit 91 (a voltage value in the present embodiment) and outputs the control signal thus generated to the power receiving side communication unit 74. In a specific example, the control comparing unit 73 compares the value detected by the detection unit 91 with a predetermined reference value (a reference voltage value in the present embodiment) that serves as a target value and spontaneously changes the reference value to change a control signal when performing control such that the detected value is kept at the reference value (the target value). In another example, when a voltage supplied from the output circuit unit 72 to the load 21 is divided and measured, the control comparing unit 73 compares the voltage after division with a predetermined reference value (a reference voltage value in the present embodiment) that serves as a target value and spontaneously changes the reference value to change a control signal when performing control such that the voltage after division is kept at the reference value (the target value).

Here, as a mode in which the control comparing unit 73 spontaneously changes the reference value of the control signal, it is possible to use, for example, the same as any one of the modes that have been described with regard to control of changing a value by the voltage changing unit 56 of the power transmission device 11.

[Mode of Spontaneously Changing Control Target Value]

A plurality of types of targets have been described above as a target to be spontaneously changed. Here, such a target will be referred to as a control target value for convenience of explanation.

In the present embodiment, to spontaneously change the control target value does not mean, for example, to change the control target value in response to a change in the output, a feedback signal corresponding to a change in the output, or a disturbance. Instead, to spontaneously change the control target value means to change the control target value according to a predetermined method regardless of a change in the output, a feedback signal corresponding to a change in the output, or a disturbance. As the predetermined method, it is possible to use, for example, a method in which the timing of changing the control target value and the value of the control target value changed at each timing are determined in a fixed manner or a method in which one or both of the timing of changing the control target value and the value of the control target value changed at each timing are determined randomly.

As a specific example, in a mode in which the control target value is spontaneously changed, the control target value is changed to both an upper limit value and a lower limit value of a range in which the control target value is variable (that is, both ends of the range) a plurality of times within a limited time.

[About Present Embodiment]

In the wireless power transmission system 1 according to the present embodiment, one or both of the power transmission device 11 and the power receiving device 12 change a predetermined control target value such that the drive frequency is controlled in response to change of the control target value as described above, thereby achieving noise frequency dispersion.

Thus, the wireless power transmission system 1 according to the present embodiment can increase a frequency change width (frequency dispersion region) while curbing output fluctuations.

<Exemplary Configurations>

As an exemplary configuration, a power transmission device (the power transmission device 11 in the example of FIG. 1) wirelessly transmits power to a power receiving device (the power receiving device 12 in the example of FIG. 1) and is configured as follows.

The power transmission device includes an inverter (inverter 52 in the example of FIG. 1) configured to convert a voltage into an alternating current (AC) voltage with a drive frequency, a power supply (the power supply of the power supply unit 51 in the example of FIG. 1) configured to generate the voltage to be supplied to the inverter, a power transmission coil (the power transmission coil of the power transmission coil device 53 in the example of FIG. 1) configured to be supplied with the AC voltage and generate an AC magnetic field, and a voltage changing unit (the voltage changing unit 56 in the example of FIG. 1) configured to spontaneously change an output voltage of the power supply. The inverter is configured to control the drive frequency in response to a change in the output voltage.

In the power transmission device as an exemplary configuration, the voltage changing unit is configured to change a reference voltage of the power supply to change the output voltage.

In the power transmission device as an exemplary configuration, the voltage changing unit is configured to change the output voltage continuously.

In this case, in the power transmission device as an exemplary configuration, the inverter is configured to control the drive frequency through feedback control that is to control a predetermined value (control target value) in the power receiving device such that the predetermined value becomes a target value. The predetermined value changes in response to a change in the output voltage.

In this case, in the power transmission device as an exemplary configuration, a period corresponding to a reciprocal of a frequency of a control loop of changing the output voltage is longer than a period with which a loop gain of feedback control is 0 dB.

In the power transmission device as an exemplary configuration, the voltage changing unit is configured to change the output voltage discretely.

In this case, in the power transmission device as an exemplary configuration, the inverter is configured to control the drive frequency through feedback control that is to control a predetermined value (control target value) in the power receiving device such that the predetermined value becomes a target value. The predetermined value changes in response to a change in the output voltage.

In this case, in the power transmission device as an exemplary configuration, a period of a control loop of changing the output voltage, the period corresponding to a duration during which the output voltage is constant, is longer than a period with which a loop gain of feedback control is 0 dB.

A wireless power transmission system as an exemplary configuration includes the power transmission device described above and the power receiving device described above.

In the wireless power transmission system as an exemplary configuration, the power receiving device includes a power receiving coil (the power receiving coil of the power receiving coil device 71 in the example of FIG. 1), a conversion unit (the conversion unit 61 in the example of FIG. 1) configured to convert AC power that the power receiving coil has received from the power transmission coil into direct current (DC), and a detection unit (the detection unit 91 in the example of FIG. 1) configured to detect a control target value. The conversion unit is configured to operate such that a predetermined change target value, which affects a control signal generated based on the control target value and a reference value, is spontaneously changed. The inverter is configured to control the drive frequency in response to a change in the change target value.

In the wireless power transmission system as an exemplary configuration, the conversion unit is configured to spontaneously change the control target value detected by the detection unit as the change target value.

In the wireless power transmission system as an exemplary configuration, the conversion unit is configured to spontaneously change the reference value as the change target value.

In the wireless power transmission system as an exemplary configuration, the change target value is changed continuously.

In this case, in the wireless power transmission system as an exemplary configuration, the inverter is configured to control the drive frequency through feedback control that is to control the control target value in the power receiving device such that the control target value becomes a target value. The control target value changes in response to a change in the change target value.

In this case, in the wireless power transmission system as an exemplary configuration, a period corresponding to a reciprocal of a frequency of a control loop of changing the change target value is longer than a period with which a loop gain of feedback control is 0 dB.

In the wireless power transmission system as an exemplary configuration, the change target value is changed discretely.

In this case, in the wireless power transmission system as an exemplary configuration, the inverter is configured to control the drive frequency through feedback control that is to control the control target value in the power receiving device such that the control target value becomes a target value. The control target value changes in response to a change in the change target value.

In this case, in the wireless power transmission system as an exemplary configuration, a period of a control loop of changing the change target value, the period corresponding to a duration during which the change target value is constant, is longer than a period with which a loop gain of feedback control is 0 dB.

In the wireless power transmission system as an exemplary configuration, the control target value is an output current.

[Modifications]

The case where feedback control is performed on the basis of the voltage detected by the detection unit 91 of the power receiving device 12 has been described in the above embodiment. However, in another example, a current or power may be used instead of the voltage.

The case where feedback control from the power receiving device 12 to the power transmission device 11 is performed has been described in the above embodiment. However, feedback control is not necessarily performed. For example, feedforward control or predictive control may be performed. Also, feedback control or feedforward control and predictive control may be performed in combination.

[Another Example of Wireless Power Transmission System]

Figure 16:
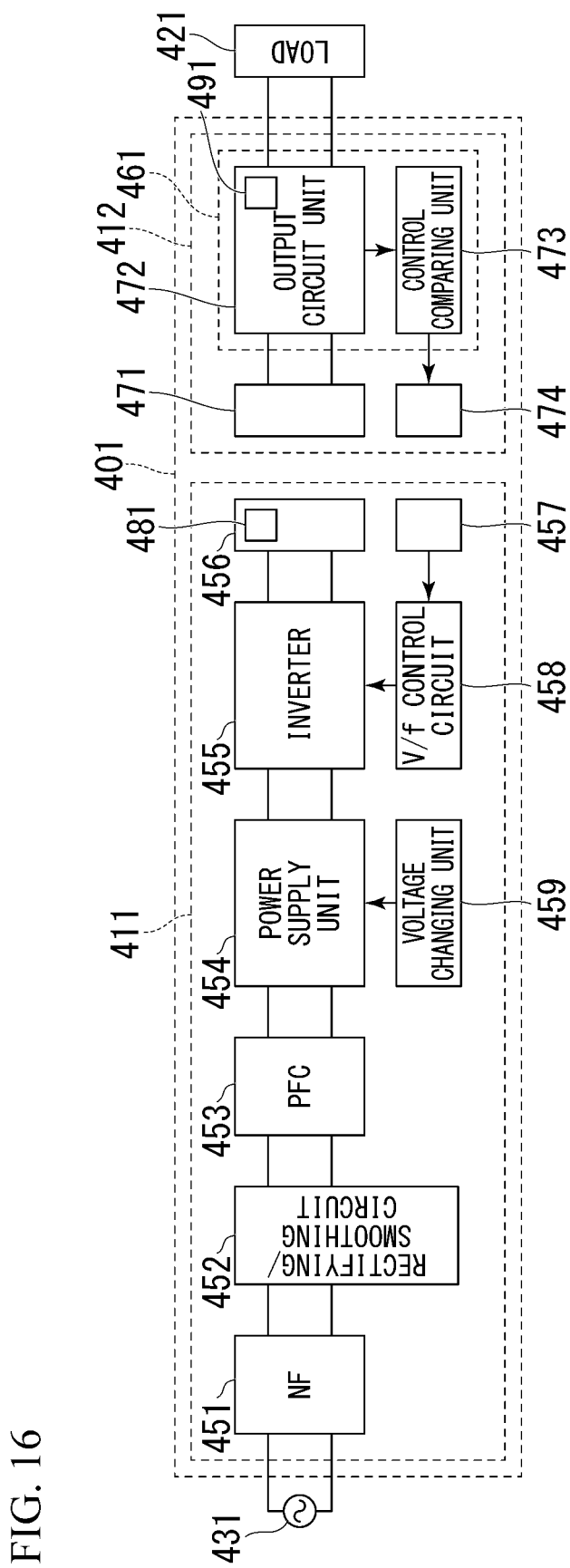
FIG. 16 is a diagram showing a schematic configuration of a wireless power transmission system according to another embodiment of the present invention.

FIG. 16 is a diagram showing a schematic configuration of a wireless power transmission system 401 according to another embodiment of the present invention.

The wireless power transmission system 401 includes a power transmission device 411 and a power receiving device 412.

FIG. 16 also shows an AC unit 431 and a load 421.

The power transmission device 411 includes a noise filter (NF) 451, a rectifying/smoothing circuit 452, a power factor correction (PFC) circuit 453, a power supply unit 454, an inverter 455, a power transmission coil device 456, a power transmission side communication unit 457, a V/f control circuit 458, and a voltage changing unit 459. The power transmission coil device 456 includes a power transmission side resonance circuit 481. The power transmission side resonance circuit 481 includes a power transmission coil and a power transmission side capacitor. In the present embodiment, the AC unit 431 is separate from the power transmission device 411. However, in another exemplary configuration, the AC unit 431 may be integrated with the power transmission device 411.

The power receiving device 412 includes a power receiving coil device 471, an output circuit unit 472, a control comparing unit 473, and a power receiving side communication unit 474. The output circuit unit 472 includes a detection unit 491. In the present embodiment, the load 421 is separate from the power receiving device 412. However, in another exemplary configuration, the load 421 may be integrated with the power receiving device 412.

In the present embodiment, the output circuit unit 472 and the control comparing unit 473 are shown as part of the conversion unit 461 for convenience of explanation. Note that the detection unit 491 may be provided at an arbitrary position in the power receiving device 412.

Here, the configuration and operation of the wireless power transmission system 401 shown in FIG. 16 are different from those of the wireless power transmission system 1 shown in FIG. 1 in that the noise filter 451, the rectifying/smoothing circuit 452, and the PFC circuit 453 are provided in the power transmission device 411 such that they are closer to the AC unit 431 than the power supply unit 454 is, and the other points are the same.

In the power transmission device 411, the noise filter 451 removes noise from an AC voltage supplied from the AC unit 431.

The rectifying/smoothing circuit 452 rectifies and smoothes on the AC voltage from which noise has been removed.

The PFC circuit 453 improves the power factor of the rectified and smoothed voltage. Then, the PFC circuit 453 supplies the voltage with the improved power factor to the power supply unit 454.

In the present embodiment, the power supply unit 454 converts the voltage supplied from the PFC circuit 453 on the basis of a value based on a reference voltage input from the voltage changing unit 459.

The wireless power transmission system 401 shown in FIG. 16 can achieve the same advantages as those of the wireless power transmission system 1 shown in FIG. 1.

[About Embodiments Above]

A program for realizing some or all of the functions of each device (for example, the power transmission devices 11 and 411 or the power receiving devices 12 and 412) according to the embodiments shown above may be recorded on a computer readable recording medium (storage medium) and a computer system may be caused to read and execute the program recorded on the recording medium to perform the processing.

The "computer system" referred to here may include an operating system (OS) or hardware such as peripheral devices.

The "computer readable recording medium" refers to a portable medium such as a flexible disk, a magneto-optical disk, a read only memory (ROM), a writable nonvolatile memory such as a flash memory, or a digital versatile disc (DVD), or a storage device such as a hard disk provided in a computer system. The recording medium may be, for example, a recording medium that temporarily records data.

It is assumed that the "computer readable recording medium" includes one that holds the program for a certain period of time, like a volatile memory (for example, a dynamic random access memory (DRAM)) provided in a computer system which serves as a server or a client when the program has been transmitted via a network such as the Internet or a communication line such as a telephone line.

The program may also be transmitted from a computer system in which the program is stored in a storage device or the like to another computer system via a transmission medium or by transmission waves in the transmission medium. Here, the "transmission medium" for transmitting the program refers to a medium having a function of transmitting information, like a network (a communication network) such as the Internet or a communication line (a communication wire) such as a telephone line.

The program may be one for realizing some of the above-described functions. The program may also be a so-called differential file (differential program) which can realize the above-described functions in combination with a program already recorded in the computer system.

Although embodiments of the present invention have been described above in detail with reference to the drawings, the specific configurations thereof are not limited to those of the embodiments and also include a design change or the like without departing from the spirit of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES 1, 401 Wireless power transmission system
11, 411 Power transmission device
12, 412 Power receiving device
21, 421 Load
31, 431 AC unit
51, 454 Power supply unit
52, 455 Inverter
53, 456 Power transmission coil device
54, 457 Power transmission side communication unit
55, 458 V/f control circuit
56, 459 Voltage changing unit
61, 461 Conversion unit
71, 471 Power receiving coil device
72, 472 Output circuit unit
73, 473 Control comparing unit
74, 474 Power receiving side communication unit
81, 481 Power transmission side resonance circuit
91, 491 Detection unit
211, 251 Operational amplifier
221, 261 Voltage input terminal
222 to 223, 262 to 264, 271 to 272 Resistor
224, 265 Ground terminal
225, 266 Reference voltage source
226, 275 AC generator
311, 321 Positive input terminal
312, 322 Negative input terminal
313, 323 Output terminal
273 Transistor
274 Voltage source
451 Noise filter
452 Rectifying/smoothing circuit
453 PFC circuit
1011 to 1012, 1021 to 1022 Output frequency characteristics
1111, 1121, 1131, 1211, 1221, 1231, 1311, 1321, 1331, 1411 Characteristics

What is claimed is:

1. A power transmission device for wirelessly transmitting power to a power receiving device, the power transmission device comprising:
    an inverter configured to convert a voltage into an alternating current voltage with a drive frequency;
    a power supply configured to generate the voltage to be supplied to the inverter;
    a power transmission coil configured to be supplied with the alternating current voltage and generate an alternating current magnetic field; and
    a voltage changing unit configured to spontaneously change an output voltage of the power supply,
    wherein the inverter is configured to control the drive frequency in response to a change in the output voltage,
    the voltage changing unit is configured to change the output voltage continuously,
    the inverter is configured to control the drive frequency through feedback control that is to control a predetermined value in the power receiving device such that the predetermined value becomes a target value,
    the predetermined value changes in response to a change in the output voltage, and
    a period corresponding to a reciprocal of a frequency of a control loop of changing the output voltage is longer than a period with which a loop gain of feedback control is 0 dB.

2. The power transmission device according to claim 1, wherein the voltage changing unit is configured to change a reference voltage of the power supply to change the output voltage.

3. A wireless power transmission system comprising the power transmission device according to claim 1 and the power receiving device.

4. The wireless power transmission system according to claim 3, wherein the power receiving device includes a power receiving coil, a conversion unit configured to convert alternating current power that the power receiving coil has received from the power transmission coil into direct current, and a detection unit configured to detect a control target value,
    the conversion unit is configured to operate such that a predetermined change target value, which affects a control signal generated based on the control target value and a reference value, is spontaneously changed, and
    the inverter is configured to control the drive frequency in response to a change in the change target value.

5. The wireless power transmission system according to claim 4, wherein the conversion unit is configured to spontaneously change the control target value detected by the detection unit as the change target value.

6. The wireless power transmission system according to claim 4, wherein the conversion unit is configured to spontaneously change the reference value as the change target value.

7. The wireless power transmission system according to claim 4, wherein the control target value is an output current.

8. A power transmission device for wirelessly transmitting power to a power receiving device, the power transmission device comprising:
    an inverter configured to convert a voltage into an alternating current voltage with a drive frequency;
    a power supply configured to generate the voltage to be supplied to the inverter;
    a power transmission coil configured to be supplied with the alternating current voltage and generate an alternating current magnetic field; and
    a voltage changing unit configured to spontaneously change an output voltage of the power supply,
    wherein the inverter is configured to control the drive frequency in response to a change in the output voltage,
    the voltage changing unit is configured to change the output voltage discretely,
    the inverter is configured to control the drive frequency through feedback control that is to control a predetermined value in the power receiving device such that the predetermined value becomes a target value,
    the predetermined value changes in response to a change in the output voltage, and
    a period of a control loop of changing the output voltage, the period corresponding to a duration during which the output voltage is constant, is longer than a period with which a loop gain of feedback control is 0 dB.

9. The power transmission device according to claim 8, wherein the voltage changing unit is configured to change a reference voltage of the power supply to change the output voltage.

10. A wireless power transmission system comprising the power transmission device according to claim 8 and the power receiving device.

11. The wireless power transmission system according to claim 10, wherein the power receiving device includes a power receiving coil, a conversion unit configured to convert alternating current power that the power receiving coil has received from the power transmission coil into direct current, and a detection unit configured to detect a control target value,
    the conversion unit is configured to operate such that a predetermined change target value, which affects a control signal generated based on the control target value and a reference value, is spontaneously changed, and
    the inverter is configured to control the drive frequency in response to a change in the change target value.

12. The wireless power transmission system according to claim 11, wherein the conversion unit is configured to spontaneously change the control target value detected by the detection unit as the change target value.

13. The wireless power transmission system according to claim 11, wherein the conversion unit is configured to spontaneously change the reference value as the change target value.

14. The wireless power transmission system according to claim 11, wherein the control target value is an output current.

15. A wireless power transmission system comprising a power transmission device for wirelessly transmitting power to a power receiving device and the power receiving device, the power transmission device comprising:
    an inverter configured to convert a voltage into an alternating current voltage with a drive frequency;
    a power supply configured to generate the voltage to be supplied to the inverter;
    a power transmission coil configured to be supplied with the alternating current voltage and generate an alternating current magnetic field; and
    a voltage changing unit configured to spontaneously change an output voltage of the power supply,
    wherein the inverter is configured to control the drive frequency in response to a change in the output voltage,
    the power receiving device includes a power receiving coil, a conversion unit configured to convert alternating current power that the power receiving coil has received from the power transmission coil into direct current, and a detection unit configured to detect a control target value,
    the conversion unit is configured to operate such that a predetermined change target value, which affects a control signal generated based on the control target value and a reference value, is spontaneously changed,
    the inverter is configured to control the drive frequency in response to a change in the change target value,
    the change target value is changed continuously,
    the inverter is configured to control the drive frequency through feedback control that is to control the control target value in the power receiving device such that the control target value becomes a target value,
    the control target value changes in response to a change in the change target value, and
    a period corresponding to a reciprocal of a frequency of a control loop of changing the change target value is longer than a period with which a loop gain of feedback control is 0 dB.

16. The wireless power transmission system according to claim 15, wherein the voltage changing unit is configured to change a reference voltage of the power supply to change the output voltage.

17. The wireless power transmission system according to claim 15, wherein the conversion unit is configured to spontaneously change the control target value detected by the detection unit as the change target value.

18. The wireless power transmission system according to claim 15, wherein the conversion unit is configured to spontaneously change the reference value as the change target value.

19. The wireless power transmission system according to claim 15, wherein the control target value is an output current.

20. A wireless power transmission system comprising a power transmission device for wirelessly transmitting power to a power receiving device and the power receiving device, the power transmission device comprising:

an inverter configured to convert a voltage into an alternating current voltage with a drive frequency;

a power supply configured to generate the voltage to be supplied to the inverter;

a power transmission coil configured to be supplied with the alternating current voltage and generate an alternating current magnetic field; and a voltage changing unit configured to spontaneously change an output voltage of the power supply, wherein the inverter is configured to control the drive frequency in response to a change in the output voltage, the power receiving device includes a power receiving coil, a conversion unit configured to convert alternating current power that the power receiving coil has received from the power transmission coil into direct current, and a detection unit configured to detect a control target value, the conversion unit is configured to operate such that a predetermined change target value, which affects a control signal generated based on the control target value and a reference value, is spontaneously changed, the inverter is configured to control the drive frequency in response to a change in the change target value, the change target value is changed discretely, the inverter is configured to control the drive frequency through feedback control that is to control the control target value in the power receiving device such that the control target value becomes a target value, the control target value changes in response to a change in the change target value, a period of a control loop of changing the change target value, the period corresponding to a duration during which the change target value is constant, is longer than a period with which a loop gain of feedback control is 0 dB.

21. The wireless power transmission system according to claim 20, wherein the voltage changing unit is configured to change a reference voltage of the power supply to change the output voltage.

22. The wireless power transmission system according to claim 20, wherein the conversion unit is configured to spontaneously change the control target value detected by the detection unit as the change target value.

23. The wireless power transmission system according to claim 20, wherein the conversion unit is configured to spontaneously change the reference value as the change target value.

24. The wireless power transmission system according to claim 20, wherein the control target value is an output current.

* * * * *